United States Patent
Nakajo et al.

(10) Patent No.: US 11,892,186 B2
(45) Date of Patent: Feb. 6, 2024

(54) DETECTION DEVICE

(71) Applicant: Toshiba Carrier Corporation, Kawasaki (JP)

(72) Inventors: Takashi Nakajo, Fuji (JP); Masato Abe, Fuji (JP); Nariya Komazaki, Fuji (JP)

(73) Assignee: Toshiba Carrier Corporation, Kawasaki (JP)

( * ) Notice: Subject to any disclaimer, the term of this patent is extended or adjusted under 35 U.S.C. 154(b) by 264 days.

(21) Appl. No.: 17/269,436

(22) PCT Filed: Sep. 4, 2019

(86) PCT No.: PCT/JP2019/034744
§ 371 (c)(1),
(2) Date: Feb. 18, 2021

(87) PCT Pub. No.: WO2020/066508
PCT Pub. Date: Apr. 2, 2020

(65) Prior Publication Data
US 2021/0325073 A1    Oct. 21, 2021

(30) Foreign Application Priority Data

Sep. 26, 2018  (JP) .................................. 2018-179753

(51) Int. Cl.
*F24F 11/65* (2018.01)
*F24F 11/54* (2018.01)
(Continued)

(52) U.S. Cl.
CPC ............. *F24F 11/65* (2018.01); *F24F 1/0007* (2013.01); *F24F 1/26* (2013.01); *F24F 11/54* (2018.01);
(Continued)

(58) Field of Classification Search
CPC ... F24F 11/54; F24F 11/65; G05B 2219/2614; G08C 19/22
See application file for complete search history.

(56) References Cited

U.S. PATENT DOCUMENTS

| 8,971,206 B2 | 3/2015 | Reidl et al. |
| 2015/0004840 A1 | 1/2015 | Mullins et al. |

(Continued)

FOREIGN PATENT DOCUMENTS

| CN | 101741542 A | 6/2010 |
| CN | 106416055 A | 2/2017 |

(Continued)

OTHER PUBLICATIONS

Translation of JPH11274987A, (Year: 1999).*

(Continued)

*Primary Examiner* — Mohammad Ali
*Assistant Examiner* — Vincent W Chang
(74) *Attorney, Agent, or Firm* — Oblon, McClelland, Maier & Neustadt, L.L.P.

(57) ABSTRACT

A detection device is connected to a plurality of communication devices by a communication line. The detection device has a reception unit, a measurement unit, and a detection unit. The reception unit receives signals with prescribed pulse widths transmitted from the plurality of communication devices, respectively. The measurement unit measures the pulse widths of the signals received by the reception unit. The detection unit is configured to detect the communication device disposed near a terminal end of the communication line as a terminal-end communication device on the basis of the plurality of pulse widths measured by the measurement unit.

11 Claims, 9 Drawing Sheets

(51) Int. Cl.
  *F24F 11/58*  (2018.01)
  *F24F 11/61*  (2018.01)
  *F24F 1/0007* (2019.01)
  *F24F 1/26*   (2011.01)
  *G05B 19/045* (2006.01)
  *G08C 19/22*  (2006.01)

(52) U.S. Cl.
  CPC .............. *F24F 11/58* (2018.01); *F24F 11/61* (2018.01); *G05B 19/045* (2013.01); *G08C 19/22* (2013.01); *G05B 2219/25268* (2013.01); *G05B 2219/2614* (2013.01)

(56) References Cited

U.S. PATENT DOCUMENTS

| | | | |
|---|---|---|---|
| 2015/0304203 A1* | 10/2015 | Wang | H04L 12/40169 370/249 |
| 2017/0131395 A1 | 5/2017 | Reynolds et al. | |
| 2018/0019787 A1* | 1/2018 | Kotake | H04L 25/0278 |
| 2021/0320898 A1* | 10/2021 | Doumae | G08C 15/04 |

FOREIGN PATENT DOCUMENTS

| | | | |
|---|---|---|---|
| CN | 107078808 A | | 8/2017 |
| EP | 0 845 863 A3 | | 12/1999 |
| JP | H0738580 A | * | 6/1993 |
| JP | H06338889 A | * | 12/1994 |
| JP | 8-114349 A | | 5/1996 |
| JP | 2776624 B2 | | 7/1998 |
| JP | 11-274987 A | | 10/1999 |
| JP | 3064168 B2 | | 7/2000 |
| JP | 2003-535344 A | | 11/2003 |
| JP | 2010-171859 A | | 8/2010 |
| JP | 2011-176436 A | | 9/2011 |
| JP | 2015-133627 A | | 7/2015 |
| JP | 2019041384 A | * | 3/2019 |
| WO | WO 01/92904 A2 | | 12/2001 |
| WO | WO 01/92904 A3 | | 12/2001 |
| WO | WO 2018/112239 A1 | | 6/2018 |

OTHER PUBLICATIONS

Translation of JP2019041384A, (Year: 2019).*
Translation of JPH06338889A, (Year: 1994).*
Translation of JPH08114349A, (Year: 1996).*
International Search Report dated Oct. 8, 2019 in PCT/JP2019/034744 filed on Sep. 4, 2019, 2 pages.
Australian Office Action dated Feb. 18, 2022 in Australian Patent Application No. 2019347155, 5 pages.
Indian Office Action dated Mar. 4, 2022 in Indian Patent Application No. 202147008235, 5 pages.
Combined Chinese Office Action and Search Report dated Aug. 3, 2023 in Chinese Application 201980062220.8, (with partial English translation), 8 pages.

* cited by examiner

FIG. 7

| IDENTIFICATION NO. | ADDRESS |
|---|---|
| c1 | aaa.bbb |
| c2 | ccc.ddd |
| c3 | eee.fff | t1

FIG. 8

| IDENTIFICATION NO. | PULSE WIDTH [ms] |
|---|---|
| c1 | 1.4 |
| c2 | 1.2 |
| c3 | | t2

DETECTION DEVICE

TECHNICAL FIELD

The present invention relates to a detection device.

Priority is claimed on Japanese Patent Application No. 2018-179753, filed Sep. 26, 2018, the content of which is incorporated herein by reference.

BACKGROUND ART

In the related art, there is a communication system in which a plurality of cordless extension units are bus-connected to one base device via a communication line. For example, in the case of an air-conditioning system for business use installed in a large-size building or the like, the cordless extension unit is an indoor unit, and the base device is, for example, a management device such as an outdoor unit or an air-conditioning management device at a center, or the like. In such an air-conditioning system, information related to an operation of each of the connected indoor units (for example, set temperature information, sensor information, and the like) is acquired sequentially and managed collectively in the management device. In addition, in such an air-conditioning system, operations of the plurality of indoor units can also be controlled collectively by the management device. For example, in the office building, it is possible to collectively start (ON) operations of the indoor units in the office building before the attendance time of workers and collectively stop (OFF) operations of all the indoor units after leaving time according to a previously set schedule using the function. Accordingly, convenience is improved for an air-conditioning manager or the like.

Incidentally, in the communication system in which the above-mentioned bus connecting system is employed, terminating resistors are generally set in the base device and the cordless extension units disposed at a terminal end of a communication line. When a communication speed is increased and a communication wiring length is increased, an influence of the reflection of the communication signal at the terminal end may become large, and a signal waveform may be disturbed. On the other hand, since terminating resistors that are constant and appropriate for communication are set in the base device and the cordless extension units disposed close to the terminal end of the communication line, reflection of the signal can be minimized, and the communication can be performed without disturbing a signal waveform.

However, if a terminating resistor is installed temporarily, for example, when the number of cordless extension units connected to the communication line is changed due to expansion or removal or when there is replacement with a communication line of a different length or type, the cordless extension unit that sets the terminating resistor must be changed or the setting must be changed every time. In the related art, in the air-conditioning system for business use installed in a large-size building or the like, since a manager or the like of the air-conditioning system performs setting of the terminating resistor, there is a need to find the indoor unit disposed near the terminal end of the communication line. However, in such an air-conditioning system, since a plurality of indoor units are connected to an elongated communication wiring, it is not easy to manually find the indoor unit disposed near the terminal end of communication line from the indoor units.

CITATION LIST

Patent Document

[Patent Document 1]
Japanese Unexamined Patent Application, First Publication No. H08-114349
[Patent Document 2]
Japanese Patent No. 2776624
[Patent Document 3]
Japanese Patent No. 306416

SUMMARY OF INVENTION

Problems to be Solved by the Invention

In order to solve the above-mentioned problems, the present invention is directed to providing a detection device capable of detecting a communication device of a terminal end of a communication line.

Means for Solving the Problems

A detection device of an embodiment is connected to a plurality of communication devices by a communication line. The detection device has a reception unit, a measurement unit and a detection unit. The reception unit receives signals with prescribed pulse widths transmitted from the plurality of communication devices. The measurement unit measures the pulse widths of the signals received by the reception unit. The detection unit is configured to detect the communication devices disposed near the terminal end of the communication line as terminal-end communication devices on the basis of the plurality of pulse widths measured by the measurement unit.

BRIEF DESCRIPTION OF DRAWINGS

FIG. 7 is a view showing an example of a configuration of a communication device information table t1 stored in the communication device 10 according to the first embodiment.

FIG. 8 is a view showing an example of a configuration of a pulse width storage table t2 stored in the communication device 10 according to the first embodiment.

DESCRIPTION OF EMBODIMENTS

Hereinafter, a detection device of an embodiment will be described with reference to the accompanying drawings.

First Embodiment

Hereinafter, a configuration of an air-conditioning system 100 according to a first embodiment will be described.

Figure 1:
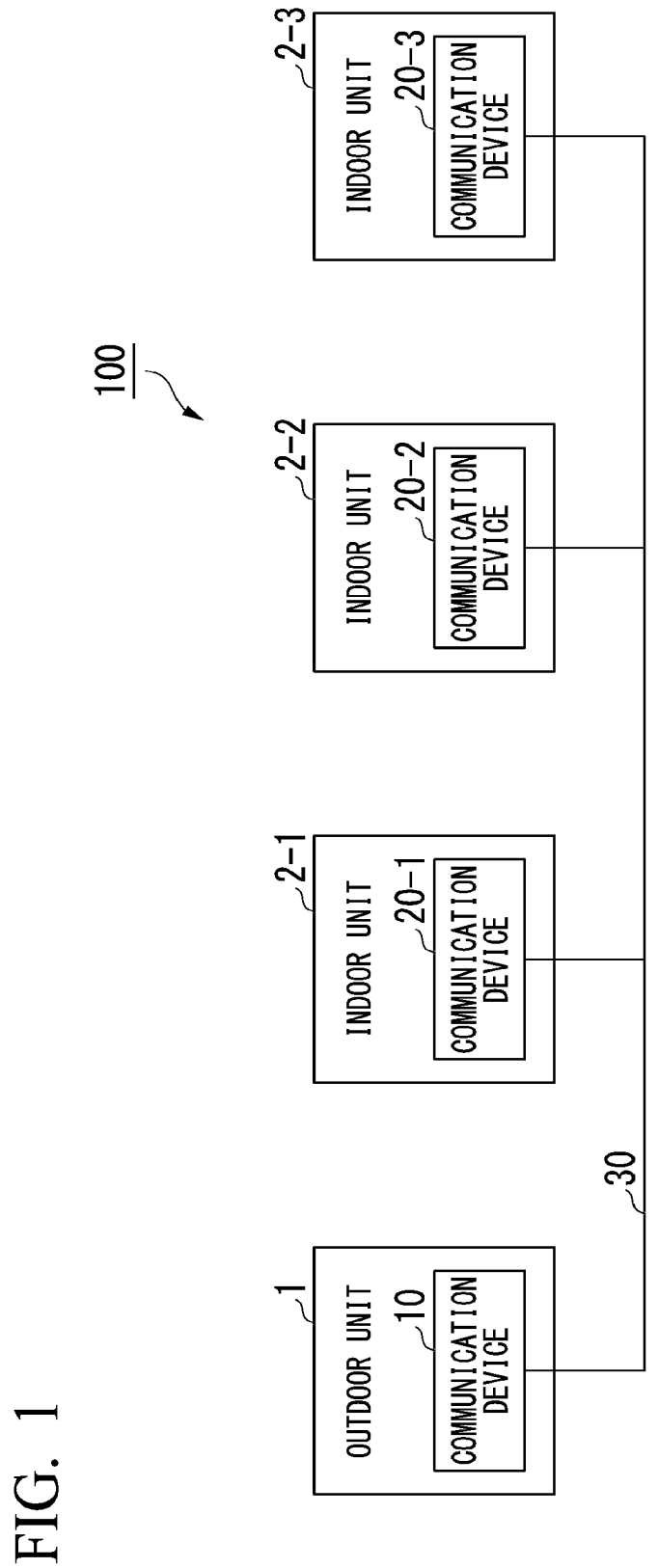
FIG. 1 is the entire configuration view of an air-conditioning system 100 according to a first embodiment.

FIG. 1 is the entire configuration view of the air-conditioning system 100 according to the first embodiment. The air-conditioning system 100 shown in FIG. 1 is, for example, an air-conditioning system installed in an office building. As shown in FIG. 1, the air-conditioning system 100 is configured to include an outdoor unit 1 that is an outdoor unit of an air-conditioner, and an indoor unit 2-1, an indoor unit 2-2 and an indoor unit 2-3 that are indoor units of the air-conditioner. Further, in the following description, when there is no need to describe the indoor unit 2-1, the indoor unit 2-2 and the indoor unit 2-3 in a distinguishable manner, they are simply referred to as "the indoor unit 2." The outdoor unit 1 and the indoor units 2 are configured as a refrigerating cycle by being connecting by a coolant pipeline. In addition, the outdoor unit 1 and the indoor units 2 are connected by a communication line 30, and the outdoor unit 1 and the indoor units 2 can exchange signals.

In this way, the air-conditioning system 100 includes the outdoor unit 1 and the plurality of indoor units 2. The outdoor unit 1 collectively controls operations of the plurality of indoor units 2. Further, the number of the plurality of indoor units 2 controlled by the outdoor unit 1 is not limited to three, and an arbitrary number of indoor units may be used.

The outdoor unit 1 includes the communication device 10 that is a base device on communication. In addition, the indoor unit 2-1, the indoor unit 2-2 and the indoor unit 2-3 include a communication device 20-1, a communication device 20-2 and a communication device 20-3 that are cordless extension units for communication, respectively. Further, in the following description, when there is no need to describe the communication device 20-1, the communication device 20-2 and the communication device 20-3 in a distinguishable manner, they are simply referred to as "a communication device 20."

As shown in FIG. 1, the communication device 10, the communication device 20-1, the communication device 20-2 and the communication device 20-3 are connected by the communication line 30 with a bus connecting system. Since only the outdoor unit 1 is disposed outdoors and the indoor units 2 are installed indoors, the communication device 10 of the outdoor unit 1 is conventionally installed at a position near one terminal end of the communication line 30.

The communication device 10 has a communication function of being configured to perform communication with the plurality of communication devices 20. For example, the communication device 10 can acquire information showing an operating status of the indoor unit 2 or can acquire information showing a temperature or a humidity of a room in which the indoor unit 2 is installed by receiving a signal transmitted from the communication device 20. In addition, the communication device 10 can control an operating state of the indoor unit 2 via, for example, the communication device 20 by transmitting the signal to the communication device 20.

The communication device 10 includes a terminating resistor 11, which will be described below. Accordingly, the communication device 10 always has a function of a terminating device. In addition, as described below in detail, the communication device 10 also includes a function as a detection device configured to detect the communication device 20 of the indoor unit installed near the terminal end on the communication line 30.

In addition, the communication device 20 includes a terminating resistor setting unit 21 provided with a terminating resistor, which will be described below. The terminating resistor setting unit 21 performs switching of settings of the terminating resistor or release of the settings on the basis of a command transmitted from the communication device 10 (the detection device). Accordingly, the communication device 20 may or may not have a function as a terminating device.

Both of the communication device 10 and the communication device 20 can perform communication by switching between communication in a high speed communication mode that is a mode of performing communication at a high speed and communication in a low speed communication mode that is a mode of performing communication at a speed relatively lower than the high speed.

In an initial state before the air-conditioning system 100 is operated, the terminating resistor is in a state in which the setting released in the terminating resistor setting unit 21 of all of the communication devices 20. Accordingly, in the initial state, since none of the communication devices 20 have a function of a terminating device, reflection of the signal transmitted by the communication line 30 is likely to occur, and the signal waveform is likely to be disturbed. Especially when communication is performed at a high speed, since the influence of the reflection of the signal tends to be large, in the initial state, both of the communication device 10 and the communication device 20 are set to a low speed communication mode.

The communication device 10 performs control such that reflection of the signal transmitted by the communication line 30 can be minimized and communication with the communication device 20 can be performed at a high speed communication mode. Specifically, the communication device 10 includes a detection function operating as a detection device and configured to detect and identify one of the communication devices 20 (i.e., the communication device 20-3) disposed near the terminal end of the communication line 30. Then, the communication device 10 transmits a command for switching a state in which a terminating resistor is set to the terminating resistor setting unit 21 of the detected communication device 20. As described below, while the communication device (detection device) 20 should be able to identify the communication device 20 disposed closest to the terminal end of the communication line 30, since the plurality of communication devices 20 cannot be distinguished when they have similar wiring lengths, one of the communication devices 20 disposed near the terminal end is identified. This also achieves the purpose of improving stability of sufficient communication (waveform).

The terminating resistor setting unit 21 of the communication device 20 disposed near the terminal end of the communication line 30 is switched to a state in which the terminating resistor is set according to the received command. Accordingly, the communication device 20 disposed near the terminal end of the communication line 30 becomes a terminating device. Then, the terminating resistor that is an appropriate constant for communication can be set in the communication device 10 and the communication device 20 disposed near both of the terminal ends of the communication line 30, reflection of the signal can be minimized, and the communication can be performed without disturbing the signal waveform.

Hereinafter, a method of detecting the communication device 20 disposed closest to the terminal end of the communication line 30 due to the function as the detection device of the communication device 10 will be described.

First, the communication device 10 commands output of pulse signals with a prescribed pulse width to the communication devices 20 in sequence. The communication device 10 receives the pulse signals output from the communication devices 20, and measures pulse widths of the pulse signals. Then, the communication device 10 identifies the shortest pulse width of the plurality of measured pulse widths. The communication device 10 detects the communication device 20 that has transmitted the pulse signal with the specified pulse width as the communication device 20 disposed at the terminal end of the communication line 30 or near the terminal end.

FIGS. 2, 3, 4 and 5 are schematic views showing detection of the communication device 20 disposed near the terminal end of the communication line 30 by the communication device 10 according to the first embodiment.

Figure 2:
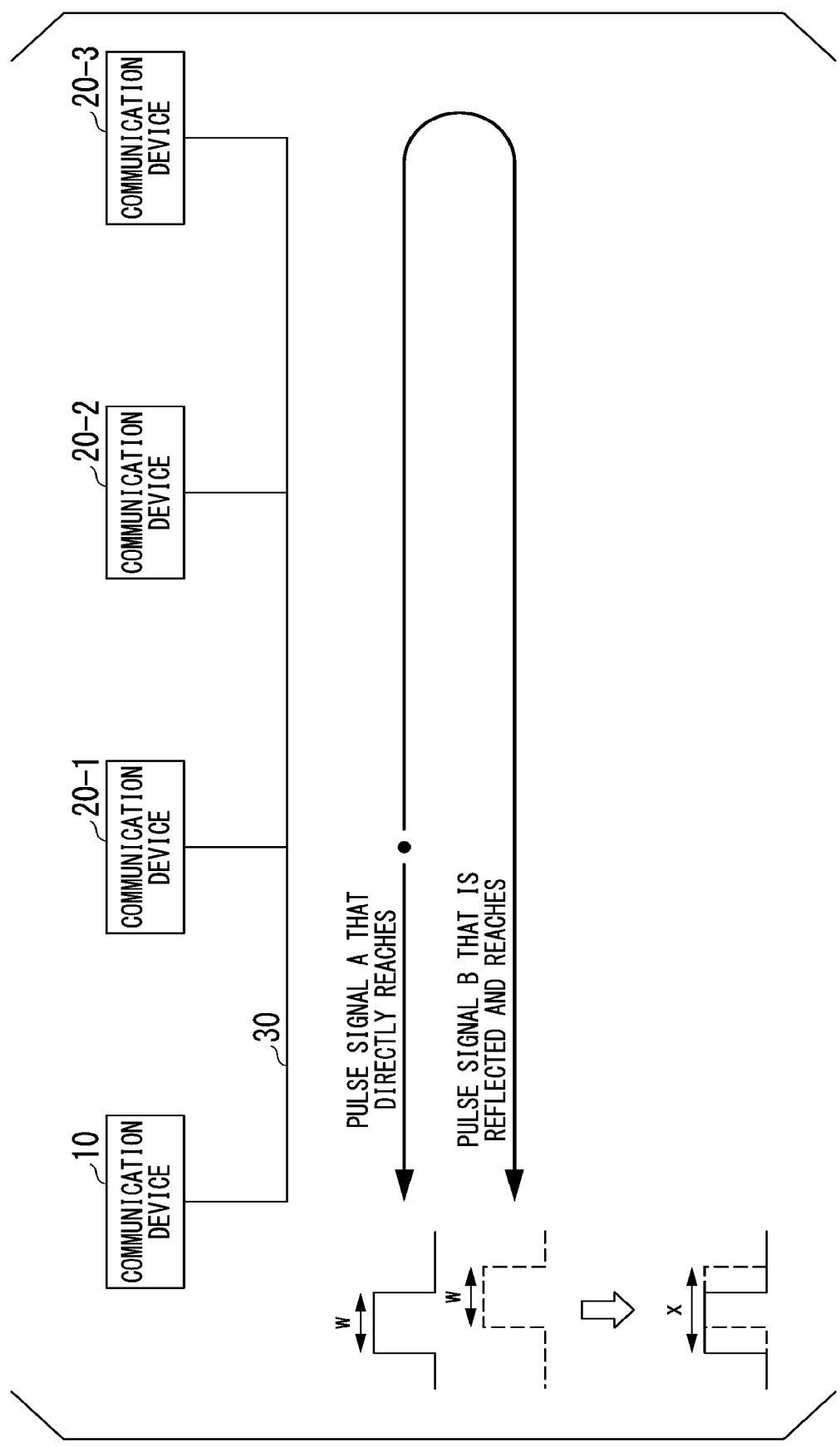
FIG. 2 is a schematic view showing detection of a communication device 20 disposed near a terminal end of a communication line 30 by a communication device 10 according to the first embodiment.

As shown in FIG. 2, for example, when a pulse signal with a prescribed pulse width w is transmitted from the communication device 20-1, there is a pulse signal A that reaches the communication device 10 directly. In addition, in the initial state, since reflection of the signal occurs when the terminating resistor is not set in any of the communication devices 20, as shown in FIG. 2, there is a pulse signal B that reflects and reaches the communication device 20-3 disposed at the terminal end of the communication line 30.

In this case, a moving distance until the pulse signal B is transmitted from the communication device 20-1 to the communication device 10 is greater than a moving distance until the pulse signal A is transmitted from the communication device 20-1 to the communication device 10. For this reason, the pulse signal B reaches the communication device 10 later than the pulse signal A. Accordingly, the communication device 10 recognizes two pulse signals (the pulse signal A and the pulse signal B) that overlap each other with a time lag as one pulse signal. That is, as shown in FIG. 2, the communication device 10 recognizes that a pulse signal with a pulse width x (x>w) in which the pulse signal A and the pulse signal B overlap each other has been received.

Figure 3:
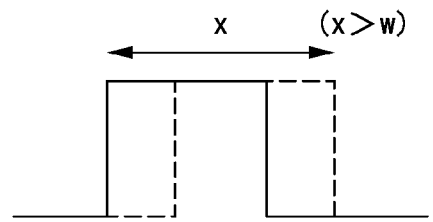
FIG. 3 is a schematic view showing detection of the communication device 20 disposed near the terminal end of the communication line 30 by the communication device 10 according to the first embodiment.

FIG. 3 shows a pulse signal recognized by the communication device 10 when the pulse signal with the pulse width w is transmitted from the communication device 20-1. In this case, as shown in FIG. 2, the pulse width with the pulse signal recognized by the communication device 10 is x (x>w).

Figure 4:
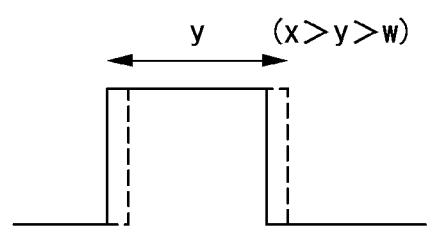
FIG. 4 is a schematic view showing detection of the communication device 20 disposed near the terminal end of the communication line 30 by the communication device 10 according to the first embodiment.

FIG. 4 shows a pulse signal recognized by the communication device 10 when the pulse signal with the pulse width w is transmitted from the communication device 20-2. When the pulse signal is transmitted from the communication device 20-2, a difference between the moving distance until the pulse signal B is transmitted from the communication device 20-1 to the communication device 10 and the moving distance until the pulse signal A is transmitted from the communication device 20-1 to the communication device 10 is smaller than that in the case in which the pulse signal is transmitted from the communication device 20-1. For this reason, the time lag between the two overlapping pulse signals (the pulse signal A and the pulse signal B) is smaller than that in the case of the pulse signal shown in FIG. 3. For this reason, as shown in FIG. 4, the communication device 10 recognizes that a pulse signal with a pulse width y (x>y>w) in which the pulse signal A and the pulse signal B overlap each other is received.

Figure 5:
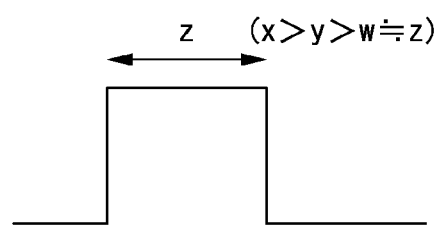
FIG. 5 is a schematic view showing detection of the communication device 20 disposed near the terminal end of the communication line 30 by the communication device 10 according to the first embodiment.

FIG. 5 shows a pulse signal recognized by the communication device 10 when the pulse signal with the pulse width w is transmitted from the communication device 20-3. When the pulse signal is transmitted from the communication device 20-3, since the communication device 20-3 is disposed nearest the terminal end of the communication line 30, reflection of the signal does not occur. That is, only the pulse signal A reaches the communication device 10. For this reason, as shown in FIG. 5, the communication device 10 recognizes that a pulse signal with a pulse width z (x>y>w≠z) is received. Further, the reason why the pulse width shown in FIG. 5 is not the same as the pulse width w of the pulse signal at the time of transmission from the communication device 20-3 is that the pulse width changes slightly due to causes other than reflection (for example, signal attenuation) or the like.

As shown in FIGS. 3 to 5, the pulse width of the pulse signal transmitted from the communication device 20, which is closer to the communication device 10, is recognized by the communication device 10 as a longer pulse width. The pulse width of the pulse signal transmitted from the communication device 20-3 farthest from the communication device 10 (i.e., disposed nearest the terminal end of the communication line 30 opposite to the communication device 10) is recognized by the communication device 10 as the shortest pulse width.

From the above, the communication device 10 identifies the shortest pulse width of the plurality of measured pulse widths, and detects the communication device 20 that has transmitted the pulse signal with the specified pulse width as the communication device 20 disposed near the terminal end of the communication line 30.

Hereinafter, a functional configuration of the communication device 10 will be described in more detail.

Figure 6:
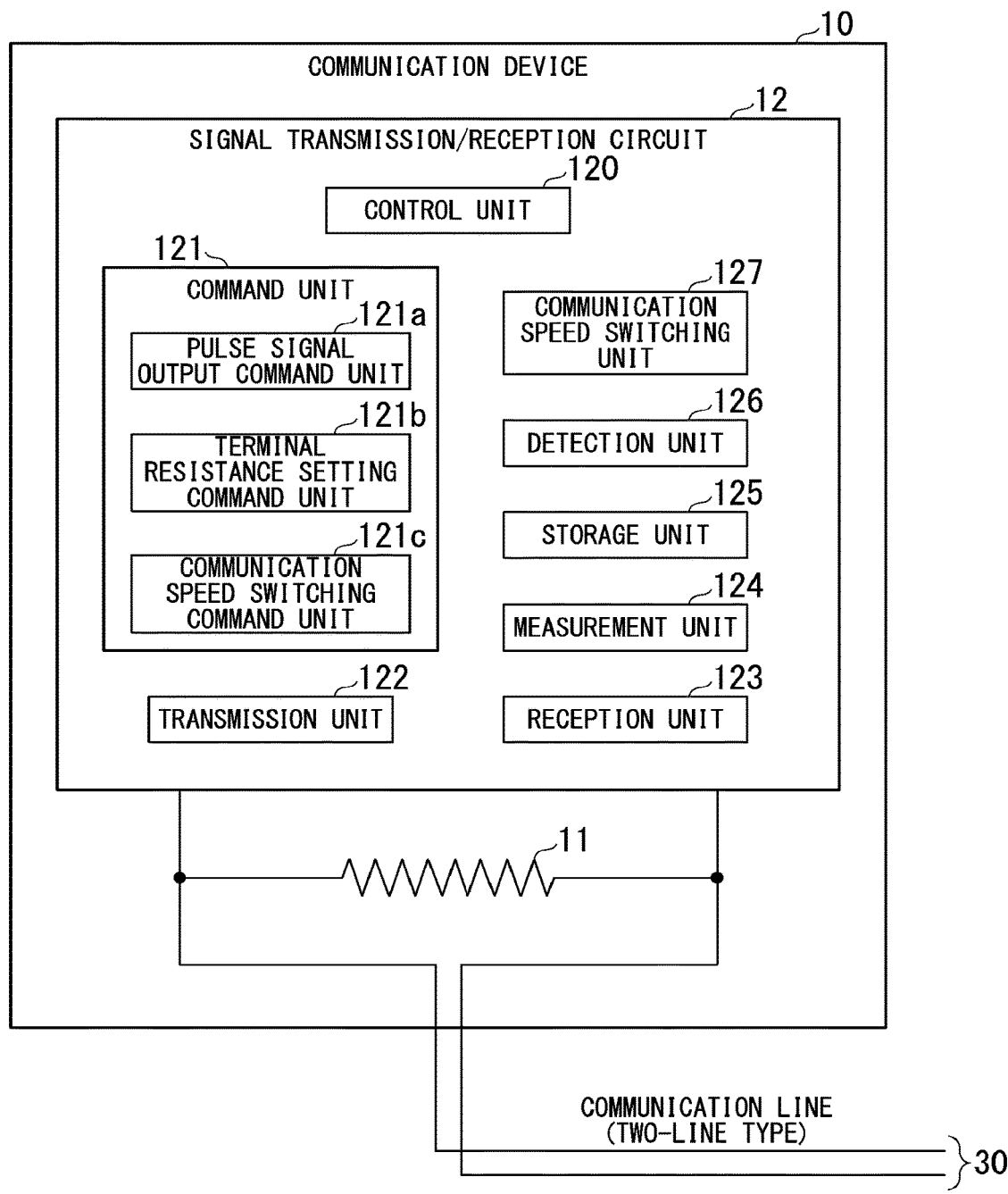
FIG. 6 is a block diagram showing a functional configuration of the communication device 10 according to the first embodiment.

FIG. 6 is a block diagram showing a functional configuration of the communication device 10 according to the first embodiment. As shown in FIG. 6, the communication device 10 is configured to include the terminating resistor 11 and a signal transmission/reception circuit 12.

As shown in FIG. 6, the terminating resistor 11 is always connected to the communication line 30 that is a two-line type communication line. Accordingly, the terminating resistor 11 makes the communication device 10 always function as a terminating device.

The signal transmission/reception circuit 12 is a main part as a detection device, and is a circuit configured to perform transmission and reception of the signal in communication between the communication devices 20. The signal transmission/reception circuit 12 is a signal transmission/reception circuit included in the communication device 10 disposed nearest one terminal end of the communication line 30 as described above. In addition, the signal transmission/reception circuit 12 detects the communication device disposed near the other terminal end of the communication line 30 (hereinafter, referred to as "a terminal-end communication device"). The signal transmission/reception circuit 12 controls a setting state of the terminating resistor in each of the communication devices 20 by transmitting a command to each of the communication devices 20.

As shown in FIG. 6, the signal transmission/reception circuit 12 is configured to include a control unit 120, a command unit 121, a transmission unit 122, a reception unit 123, a measurement unit 124, a storage unit 125, a detection unit 126, and a communication speed switching unit 127.

The control unit 120 controls processing by each functional block provided in the signal transmission/reception circuit 12. Accordingly, for example, the control unit 120 controls transmission and reception of the signal in communication between the communication devices 20. In addition, for example, the control unit 120 controls processing of detecting the terminal-end communication device. In addition, for example, the control unit 120 controls transmission of various types of commands to the communication devices 20.

The control unit 120 is a processor such as a central processing unit (CPU) or the like. Further, the control unit 120 may be realized using hardware such as a large-scale integrated circuit (LSI), an application specific integrated circuit (ASIC), or the like. In addition, each of the functional blocks provided in the signal transmission/reception circuit 12 may have a configuration realized by executing a program stored in the storage unit 125 using the control unit 120 that is a processor such as a CPU or the like.

The command unit 121 controls transmission of various types of commands transmitted to the communication devices 20. The command unit 121 outputs various types of commands to the communication devices 20 via the transmission unit 122. As shown in FIG. 6, the command unit 121 includes a pulse signal output command unit 121a, a terminating resistor setting command unit 121b, and a communication speed switching command unit 121c.

The pulse signal output command unit 121a outputs a pulse signal output command (a third command) indicating a command for outputting a pulse signal to the communication device 10 thereof to each of the communication devices 20. Further, the pulse signal output command may be configured to be transmitted to each of the communication devices 20 through broadcasting or multicasting. Further, the signal output from each of the communication devices 20 according to the pulse signal output command is a test signal that is output experimentally, and is previously set to output a pulse with exactly the same time width in any of the communication devices 20.

The terminating resistor setting command unit 121b outputs a terminating resistor setting command (a first command) indicating a command for setting a terminating resistor to the terminal-end communication device when the terminal-end communication device is detected by the detection unit 126.

Further, the terminating resistor setting command unit 121b may output a command for releasing the setting of the terminating resistor (a fourth command) to the terminal-end communication device when at least one communication device 20 is added or removed. After that, the signal transmission/reception circuit 12 may be configured to detect the terminal-end communication device again, and set the terminating resistor for the detected terminal-end communication device.

The communication speed switching command unit 121c may output a communication speed switching command (a second command) indicating a command for switching the communication setting such that a communication speed in communication with the communication device 10 thereof becomes higher (i.e., a command for switching the setting to a high speed communication mode) to the communication device 20 when the terminating resistor setting command is output by the terminating resistor setting command unit 121b.

Further, the communication speed switching command unit 121c may output a command for switching the communication setting for decreasing the communication speed in communication with the communication device 10 thereof to be lower (i.e., a command for switching the setting to a low speed communication mode) (a fifth command) to each of the communication devices 20 connected to the communication line 30 when at least one of the communication devices 20 is added or removed. After that, the signal transmission/reception circuit 12 may be configured to detect the terminal-end communication device again, and set the terminating resistor for the detected terminal-end communication device.

The transmission unit 122 and the reception unit 123 are communication interfaces configured to be connected to the communication devices 20 through communication. Further, the transmission unit 122 and the reception unit 123 may be a functional unit constituted by one piece of hardware.

The transmission unit 122 outputs various signals (pulse signals) to the communication devices 20 via the communication line 30 under the control of the control unit 120. Further, the various signals include the signals output from the command unit 121 and showing the pulse signal output command, the terminating resistor setting command, and the communication speed switching command, which are described above.

The reception unit 123 acquires various signals (pulse signals) output from the communication devices 20 via the communication line 30. Further, the various signals also include a pulse signal that is a test signal output from each of the communication devices 20 according to acquisition of the pulse signal output command. The reception unit 123 outputs the acquired pulse signal to the measurement unit 124 when the pulse signal that is a test signal is acquired.

The measurement unit 124 acquires the pulse signal that is the test signal transmitted from each of the communication devices 20 from the reception unit 123. The measurement unit 124 measures the pulse width of the acquired pulse signal. The measurement unit 124 stores the measurement value with the pulse width of the pulse signal transmitted from each of the communication devices 20 in the storage unit 125. For example, the measurement unit 124 stores the previously stored measurement value in the storage unit 125 by writing the pulse width in the storage table t2, which will be described below.

The storage unit 125 stores various types of programs and theta tables used in the signal transmission/reception circuit 12. The storage unit 125 is a non-volatile recording medium (a non-transient recording medium) such as a flash memory, a hard disk drive (HDD), or the like. In addition, the storage unit 125 may further have a volatile recording medium such as a random access memory (RAM), a register, or the like.

In addition, the storage unit 125 stores a communication device information table t1 and a pulse width storage table t2, which will be described below.

FIG. 7 is a view showing an example of a configuration of the communication device information table t1 stored in the communication device 10 according to the first embodiment. As shown in FIG. 7, the communication device information table t1 is data of a two-dimensional table form constituted by rows of two items of "identification number" and "address." The value stored in the item of the identification number is an identification number for identifying each of the communication devices 20. For example, it is shown that the identification numbers corresponding to the communication device 20-1, the communication device 20-2, and the communication device 20-3 are "c1," "c2" and "c3" stored in the communication device information table t1 shown in FIG. 7.

In addition, the communication device information table t1 is a table in which the identification numbers assigned to the communication devices 20 and the addresses required to cause the communication device 10 to perform communication with each of the communication devices 20 correspond to each other. For example, as shown in FIG. 7, the address of the communication device 20-1 to which the identification number "c1" is assigned is expressed as "aaa.bbb."

The communication device information table t1 is a table that is previously stored in the storage unit 125. The communication device 10 refers the address corresponding to the communication device 20 of a transmission destination using the communication device information table t1 when the signal is transmitted to the specified communication device 20. Then, the communication device 10 designates the referred address and transmits the signal. For example, as shown in FIG. 7, the communication device 10 can transmit the signal to the communication device 20-1 to which the identification number "c1" is assigned by designating the address referred to as "aaa.bbb" and transmitting the signal.

FIG. 8 is a view showing an example of a configuration of the pulse width storage table t2 stored in the communication device 10 according to the first embodiment. As shown in FIG. 8, the pulse width storage table t2 is data of a two-dimensional table format constituted by rows of two items of "identification number" and "pulse width." The value stored in the item of the identification number is an identification number for identifying each of the communication devices 20 like the communication device information table t1.

The pulse width storage table t2 is a table for temporarily storing pulse widths of pulse signals that are test signals output from the communication devices 20. The pulse width storage table t2 is in a state in which a value of an item of at least "pulse width" is not stored in the initial state. Whenever the pulse widths of the pulse signals output from the communication devices 20 are measured by the measurement unit 124, data showing the measurement value is written in the pulse width storage table t2.

Accordingly, the pulse width storage table t2 exemplified in FIG. 8 shows a state in which, while measurement of the pulse width of the pulse signal output from the communication device 20-1 to which the identification number "c1" is assigned and the pulse width of the pulse signal output from the communication device 20-2 to which the identification number "c2" is assigned are completed, measurement of the pulse width of the pulse signal output from the communication device 20-3 to which the identification number "c3" is assigned is not yet performed. Finally, measurement of the pulse widths from all the communication devices 20 is completed, and the pulse width storage table t2 is filled.

The pulse width storage table t2 exemplified in FIG. 8 shows that the measurement value of the pulse width of the pulse signal output from the communication device 20-1 to which the identification number "c1" is applied was "1.4" (a unit is ms (millisecond)).

Description will be performed again by returning to FIG. 6.

The detection unit 126 refers the pulse width storage table t2 stored in the storage unit 125. The detection unit 126 identifies a value of the narrowest pulse width by referring a value stored in the item of "pulse width" of the pulse width storage table t2. Then, the detection unit 126 refers the value stored in the item of "identification accompaniment" of the pulse width storage table t2, and acquires the value of the identification number corresponding to the value of the narrowest pulse width. The detection unit 126 detects the communication device 20 to which the acquired identification number is assigned as the terminal-end communication device near the terminal end.

The detection unit 126 outputs the information showing the detected communication device 20 as the terminal-end communication device (for example, an identification number) to the terminating resistor setting command unit 121*b*. The terminating resistor setting command unit 121*b* outputs the terminating resistor setting command to the communication device 20 (the terminal-end communication device) based on the information acquired from the detection unit 126.

When the terminating resistor setting command is output from the terminating resistor setting command unit 121*b*, the communication speed switching command unit 121*c* outputs a communication speed switching command to all the communication devices 20. Accordingly, in the communication device 20, the communication setting is switched to increase the communication speed in communication with the communication device 10 to be higher (i.e., switched to the high speed communication mode). Further, the communication speed switching command unit 121*c* may output the communication speed switching command to at least one communication device 20.

The communication speed switching unit 127 switches the communication setting to increase the communication speed in communication with the communication device 20 to be higher (i.e., switching the setting to the high speed communication mode) when the terminating resistor setting command is output from the terminating resistor setting command unit 121*b*). After that, the communication device 10 performs exchange of conventional information between the communication devices 20 in the high speed communication mode.

Further, the communication speed switching unit 127 may allow the terminal-end communication device to open the terminating resistor while switching the communication setting to decrease the communication speed in communication with the communication device 20 connected to the communication line 30 (i.e., switching the setting to a low speed communication mode) when at least one communication device 20 is added or removed. After that, the signal transmission/reception circuit 12 may be configured to detect the terminal-end communication device again, and set the terminating resistor for the detected terminal-end communication device. It is possible to improve stability of communication between the communication device 10 and the communication devices 20 and increase measurement accuracy of the pulse width in the measurement unit 124 using the low speed communication mode in searching of the terminal-end communication device.

Hereinafter, a configuration of the communication device 20 will be described.

Figure 9:
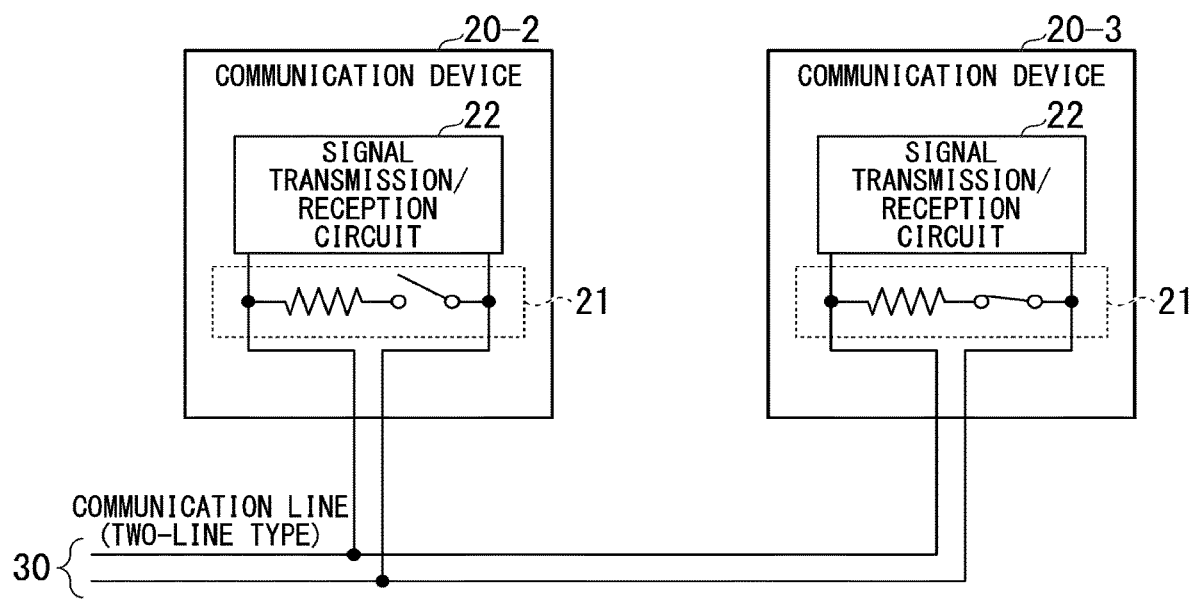
FIG. 9 is a schematic diagram showing a configuration of the communication device 20 according to the first embodiment.

FIG. 9 is a schematic diagram showing the configuration of the communication device 20 according to the first embodiment. Further, since the configurations of the communication devices 20 are the same as each other, FIG. 9 shows only the communication device 20-2 and the communication device 20-3 as an example. As shown in FIG. 9, the communication device 20 is configured to include the terminating resistor setting unit 21, and a signal transmission/reception circuit 22.

The terminating resistor setting unit 21 is configured to include the terminating resistor. The terminating resistor setting unit 21 acquires the terminating resistor setting command transmitted from the communication device 10. The terminating resistor setting unit 21 is switched to a state in which the terminating resistor is set when the terminating resistor setting command is acquired. Further, FIG. 9 shows a state in which the terminating resistor is switched to a setting state because the communication device 20-3 is the terminal-end communication device, and the terminating resistor is in a setting-released state because the communication device 20-2 is not the terminal-end communication device.

The signal transmission/reception circuit 22 is a circuit configured to perform transmission and reception of the signal in communication between the communication devices 10. In addition, the signal transmission/reception circuit 12 acquires the pulse signal output command transmitted from the communication device 10. The signal transmission/reception circuit 12 outputs the pulse signal with the prescribed pulse width w to the communication device 10 when the pulse signal output command is acquired.

In addition, the signal transmission/reception circuit 12 acquires the communication speed switching command transmitted from the communication device 10. The signal transmission/reception circuit 12 switches the communication setting to increase the communication speed in communication with the communication device 10 to be higher (i.e., switching the setting to the high speed communication mode) when the communication speed switching command is acquired.

Hereinafter, an operation of the communication device 10 will be described.

Figure 10:
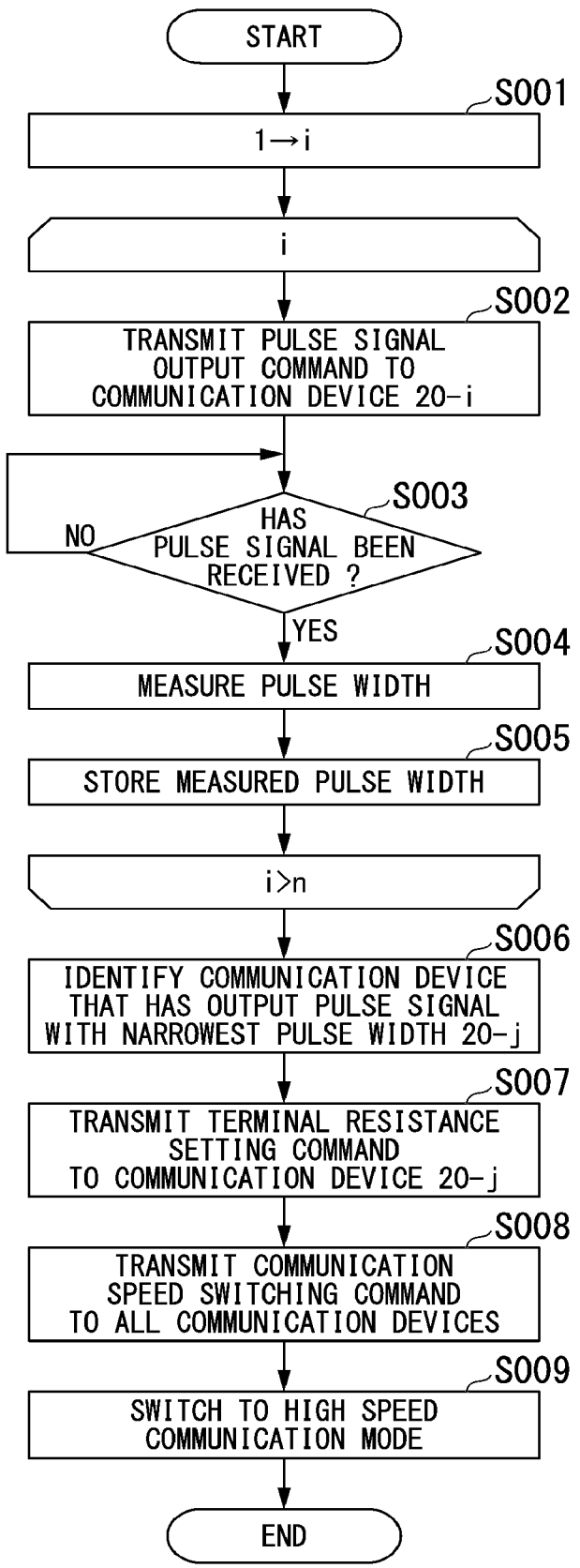
FIG. 10 is a flowchart showing an example of an operation of the communication device 10 according to the first embodiment.

FIG. 10 is a flowchart showing an example of an operation of the communication device 10 according to the first embodiment. For example, the operation of the communication device 10 shown in FIG. 10 is started in the initial state before the air-conditioning system 100 is operated.

First, the control unit 120 executes processing of substituting 1 for a variable i (step S001). Then, the control unit 120 executes processing from step S002 to step S005, which will be described below, n times (i.e., three times in the case of the configuration shown in FIG. 1) when the number of terminals connected to the communication device 10 is n.

The pulse signal output command unit 121a transmits the pulse signal output command to the communication device 20-i (i=1 to n) via the transmission unit 122 and the communication line 30 (step S002).

When the pulse signal transmitted from the communication device 20-i (i=1 to n) according to the pulse signal output command transmitted in step S002 is received by the reception unit 123 (in step S003, YES), the measurement unit 124 measures the pulse width of the received pulse signal (step S004). Meanwhile, when the pulse signal transmitted from the communication device 20-i (i=1 to n) according to the pulse signal output command transmitted in step S002 is not received (in step S003, NO), the communication device 10 waits until the pulse signal is received by the reception unit 123.

The measurement unit 124 stores the value showing the measured pulse width in the storage unit 125 by writing the value in the pulse width storage table t2 stored in the storage unit 125 (step S005).

The detection unit 126 refers the pulse width storage table t2 stored in the storage unit 125, and identifies the communication device 20-j from which the pulse signal with the narrowest pulse width is output (i.e., in the case of the configuration shown in FIG. 1, the communication device 20-j is specified) (step S006).

The terminating resistor setting command unit 121b transmits the terminating resistor setting command to the communication device 20-j via the transmission unit 122 and the communication line 30 (step S007).

The communication speed switching command unit 121c transmits the communication speed switching command to all the communication devices 20 via the transmission unit 122 and the communication line 30 (step S008).

The communication speed switching unit 127 switches the communication setting to increase the communication speed in communication with the communication device 20 to be higher (i.e., switching the setting to the high speed communication mode) (step S009).

An operation as the detection device in the communication device 10 shown by the flowchart of FIG. 10 is terminated as described above.

Hereinafter, an operation of the communication device 20 will be described.

Figure 11:
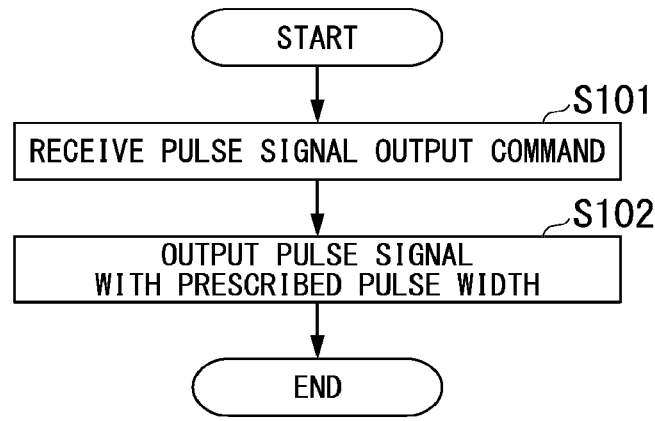
FIG. 11 is a flowchart showing an operation in pulse signal output processing of the communication device 20 according to the first embodiment.

FIG. 11 is a flowchart showing an operation in pulse signal output processing of the communication device 20 according to the first embodiment. The operation of the communication device 20 shown in FIG. 11 is started when the pulse signal output command transmitted from the communication device 10 in step S002 shown in FIG. 10 is received in the communication device 20.

The signal transmission/reception circuit 22 receives the pulse signal output command transmitted from the communication device 10 via the communication line 30 (step S101).

The signal transmission/reception circuit 22 outputs the pulse signal with the prescribed pulse width (for example, the pulse width w) to the communication device 10 via the communication line 30 (step S102).

An operation of the communication device 20 shown by the flowchart of FIG. 11 is terminated as described above.

Figure 12:
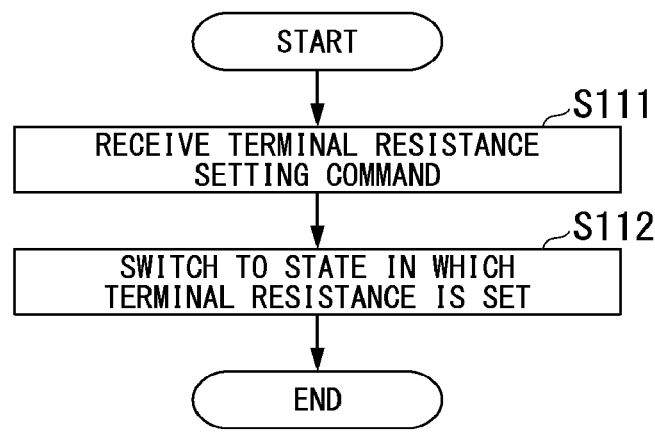
FIG. 12 is a flowchart showing an operation in terminating resistor setting processing of the communication device 20 according to the first embodiment.

FIG. 12 is a flowchart showing an operation in terminating resistor setting processing of the communication device 20 according to the first embodiment. The operation of the communication device 20 shown in FIG. 12 is started when the terminating resistor setting command transmitted from the communication device 10 in step S007 shown in FIG. 10 is received in the communication device 20.

The terminating resistor setting unit 21 acquires the terminating resistor setting command transmitted from the communication device 10 via the communication line 30 (step S111).

The terminating resistor setting unit 21 is switched to a state in which the terminating resistor is set (step S112).

The operation of the communication device 20 shown by the flowchart of FIG. 12 is terminated as described above.

Figure 13:
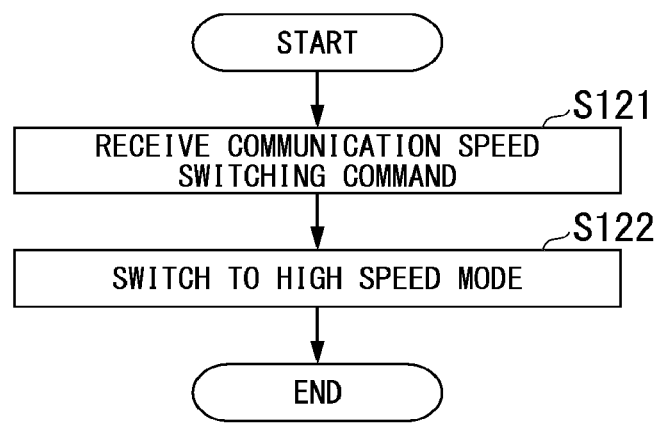
FIG. 13 is a flowchart showing an operation in communication speed switching processing of the communication device 20 according to the first embodiment.

FIG. 13 is a flowchart showing an operation in communication speed switching processing of the communication device 20 according to the first embodiment. The operation of the communication device 20 shown in FIG. 13 is started when the communication speed switching command transmitted from the communication device 10 in step S008 shown in FIG. 10 is received in the communication device 20.

The signal transmission/reception circuit 22 receives the communication speed switching command transmitted from the communication device 10 via the communication line 30 (step S121).

The signal transmission/reception circuit 22 switches the communication setting to increase the communication speed in communication with the communication device 10 to be higher (i.e., switching the setting to the high speed communication mode) (step S122).

The operation of the communication device 20 shown by the flowchart of FIG. 13 is terminated as described above.

Hereinafter, a configuration of an air-conditioning system 200 according to a variant of the first embodiment will be described.

Figure 14:
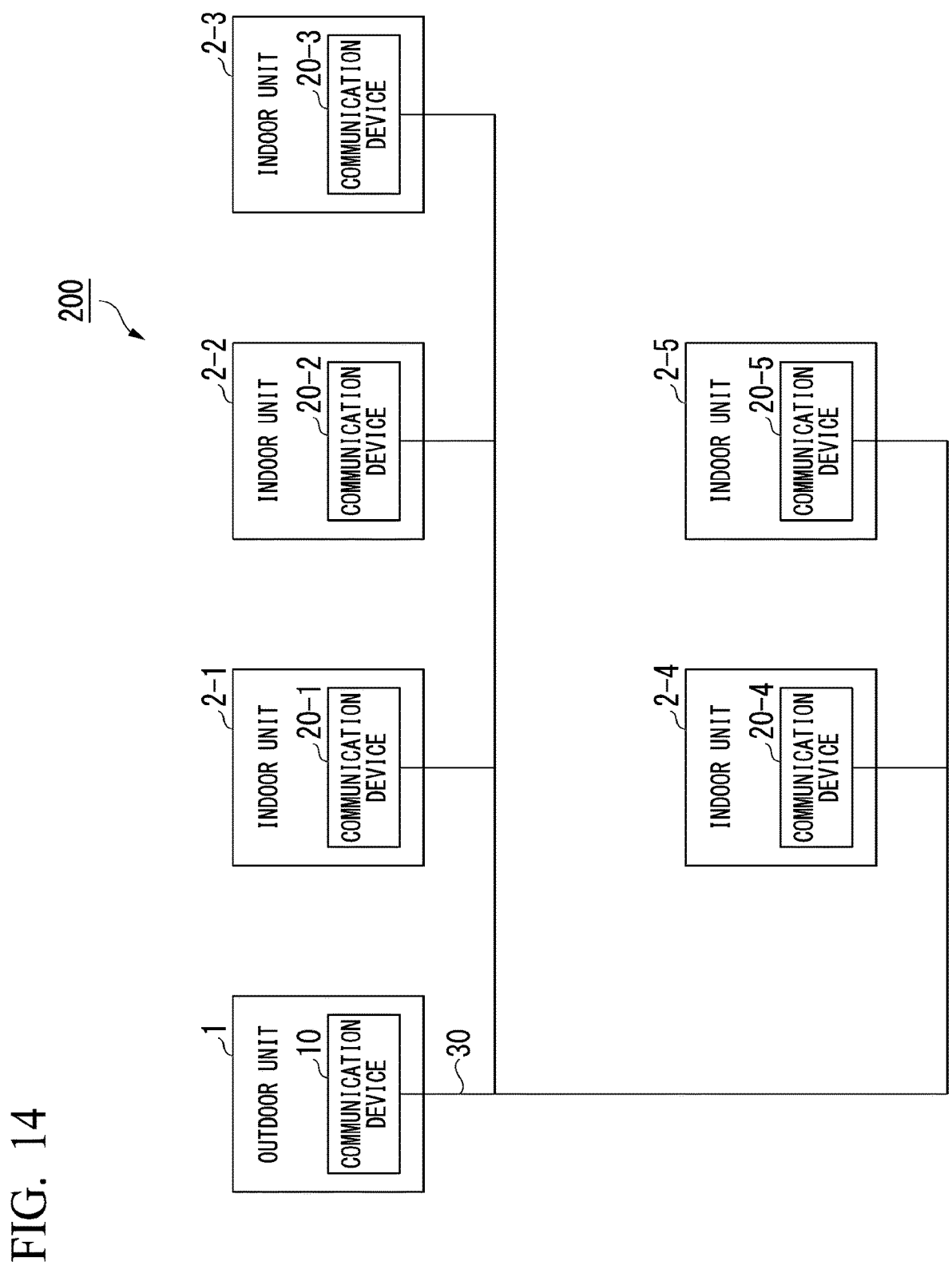
FIG. 14 is the entire configuration view of an air-conditioning system 200 according to a variant of the first embodiment.

FIG. 14 is the entire configuration view of the air-conditioning system 200 according to the variant of the first embodiment.

The configuration of the air-conditioning system 200 according to the variant of the first embodiment shown in FIG. 14 is distinguished from the configuration of the air-conditioning system 100 according to the first embodiment shown in FIG. 10 in that the communication line 30 is branched off in the middle, and the system includes an indoor unit 2-4 and an indoor unit 2-5 provided with a communication device 20-4 and a communication device 20-5.

As shown in FIG. 14, unlike the first embodiment, when the position of the communication line 30 on which the communication device 10 is installed is one terminal end, the other terminal end are present at two positions. That is, two terminal-end communication devices of the communication device 20-3 and the communication device 20-5 are present.

In this case, when the communication device 10 can previously discriminate the communication device 20 connected from the communication device 10 toward the communication device 20-3 along the communication line 30 and the communication device 20 connected from the communication device 10 toward the communication device 20-5 via the communication line 30, the communication device 10 may divide the processing into two parts, the setting of the terminating resistor with respect to the communication line 30 from the communication device 10 toward the communication device 20-3 and the setting of the terminating resistor with respect to the communication line 30 from the communication device 10 toward the communication device 20-5, and the processing according to the first embodiment may be executed respectively.

Meanwhile, even when the communication device 10 cannot discriminate the communication device 20 connected from the communication device 10 toward the communication device 20-3 along the communication line 30 and the communication device 20 connected from the communication device 10 toward the communication device 20-5 along the communication line 30, the setting of the terminating resistor with respect to the communication device 20-3 and the communication device 20-5 is possible.

In this case, like the first embodiment, the communication device 10 acquires the pulse signals that are test signals from all the communication devices 20, and measures the pulse widths, respectively. Then, the communication device 10 identifies the communication device 20 from which the pulse signal with the narrowest pulse width is output and the communication device 20 from which the pulse signal with the pulse width having a difference from the narrowest pulse width, which is smaller than a prescribed threshold, is output. Then, the communication device 10 is switched to a state in which the terminating resistor is set to the plurality of specified communication devices 20.

In FIG. 14, both of the communication device 20-3 and the communication device 20-5 are communication devices connected to the communication line 30 at positions of the terminal ends of the communication line 30. Accordingly, as shown in FIG. 5, no reflection occurs in any of the pulse signals transmitted from the communication device 20-3 and the communication device 20-5. For this reason, basically, the pulse signals transmitted from the communication device 20-3 and the communication device 20-5 are recognized by the communication device 10 as any of the pulse signals with the pulse width z.

Further, as described above, the reason why the pulse width (z) shown in FIG. 5 is not the same as the pulse width w of the pulse signal at the time of transmission from the communication device 20-3 is that the pulse width is slightly varied due to a cause other than the reflection (for example, signal attenuation) or the like. For example, due to these changes, the pulse width of the pulse signal output from the communication device 20-3 and the pulse width of the pulse signal transmitted from the communication device 20-5 do not always exactly coincide with each other.

Second Embodiment

Hereinafter, a second embodiment will be described.

In the above-mentioned first embodiment, the communication device 10 is configured to acquire the pulse signals (the test signals) output from the communication devices 20, and detect the communication device 20, which has output the pulse signal acquired as the narrowest pulse width, as the terminal-end communication device.

Meanwhile, the communication device 10 according to the second embodiment acquires the pulse signals (the test signals) output from the communication devices 20. Then, the communication device 10 according to the second embodiment includes an estimation unit (not shown) configured to estimate a length of the communication line 30 between the communication device 10 and each of the communication devices 20 on the basis of the measured pulse width. Further, the estimation method in this case is considered as, for example, a method of previously holding information in which the length of the communication line 30 between the communication device 10 and the communication device 20 corresponds to the pulse width received in the communication device 10 in the case of the length using the communication device 10 and performing estimation on the basis of the information.

According to the communication device 10 related to the second embodiment, an air-conditioning manager or the like can estimate the communication device 20 estimated to have the largest length of the communication line 30 using the estimation unit as the terminal-end communication device. Accordingly, the air-conditioning manager or the like can easily identify the terminal-end communication device, and set the terminating resistor with respect to the terminal-end communication device.

Hereinabove, while the embodiment has been described, in the above-mentioned embodiment, in order to simplify the description, only the signal reflection was targeted as a factor to change the signal waveform of the pulse signal. However, in actuality, the signal waveform changes according to the length of the communication line 30 and the number of intervening communication devices 20, and the like. For example, as the length of the communication line 30 is increased, amplitude of the pulse signal may be attenuated depending on a resistance component, or a gradient may change due to a capacitance component or the like.

However, in any case, as the length of the communication line 30 is increased (i.e., the position of the communication device 20 is goes away from the communication device 10, or the like), the waveform of the pulse signal is changed to narrow the pulse width. Accordingly, detection accuracy of the terminal-end communication device according to the embodiment is further increased.

Further, in the above-mentioned embodiment, while the used signal is the pulse signal constituted by values of 0 and 1, there is no limitation thereto. For example, even in the case of a signal for communication or the like pursuant to HBS Standard (home bus system: Electronic Industries Association of Japan (EIAJ) Standard, ET-2101), after converting to the pulse signal constituted by values of 0 and 1 as described above, the processing in the above-mentioned embodiment may be executed.

According to the at least one embodiment as described above, since the reception unit configured to receive the signals with the prescribed pulse widths transmitted from the plurality of communication devices 20, the measurement unit configured to measure the pulse widths of the signals received by the reception unit, and the detection unit configured to detect the communication device disposed near the terminal end of the communication line 30 on the basis of the plurality of measured pulse widths are provided, it is possible to automatically detect the communication device 20 of the terminal end of the communication line 30 without human intervention. Accordingly, since the terminating resistor can be set to the communication device 20 of the terminal end of the communication line 30, the communication between the communication device 10 and each of the communication devices 20 can be performed at a higher speed.

A part of or the entire communication device 10 according to the embodiment may be realized by a computer. In this case, the program configured to realize the function may be recorded on a computer-readable recording medium, and the program recorded on the recording medium may be realized by being read and executed by a computer system. Further, "the computer system" disclosed herein includes an OS or hardware such as peripheral devices or the like. In addition, "the computer-readable recording medium" refers to a portable medium such as a flexible disk, a magneto-optic disk, an ROM, a CD-ROM, or the like, and a storage device such as a hard disk or the like built in the computer system. Further, "the computer-readable recording medium" may include a medium configured to dynamically hold a program for a short time, for example, a communication line when the program is transmitted via a network such as the Internet, a communication line such as a telephone line or the like, or a medium configured to temporarily hold a program, for example, a volatile memory in the computer system that becomes a server or a client in this case. In addition, the program may be configured to realize a part of the above-mentioned function, and the function may be further realized by combination with the program already stored in the computer system or may be realized using hardware such as a programmable logic device (PLD), a field programmable gate array (FPGA), or the like.

In the embodiment, while circuit parts for communication or control processing for communication are simplified by using both the communication device 20 configured to perform conventional communication and the detection device configured to set the terminating resistor to the communication device 20 of the terminal end, these two devices may be separated, and a detection device having a function of detecting the communication device 20 of the terminal end and setting the terminating resistor to the communication device 20 may be provided separately.

While some embodiments of the present invention have been described, these embodiments are presented as examples and are not intended to limit the scope of the present invention. These embodiments may be implemented in various other forms, and various omissions, replacements, and changes may be made without departing from the spirit of the present invention. These embodiments and their variants are included in the scope and the spirit of the invention, as well as in the invention described in the claims and the equivalent scope thereof.

REFERENCE SIGNS LIST

1 Outdoor unit
2 Indoor unit
10 Communication device (detection device)
11 Terminating resistance
12 Signal transmission/reception circuit
20 Communication device
21 Terminating resistance setting unit
22 Signal transmission/reception circuit
30 Communication line
100 Air-conditioning system
120 Control unit
121 Command unit
121*a* Pulse signal output command unit
121*b* Terminating resistance setting command unit
121*c* Communication speed switching command unit
122 Transmission unit
123 Reception unit
124 Measurement unit
125 Storage unit
126 Detection unit
127 Communication speed switching unit
200 Air-conditioning system

The invention claimed is:

1. A detection device connected to a plurality of communication devices by a communication line, the detection device comprising:
 a reception unit configured to receive overlap signals in which transmitted signals with prescribed pulse widths transmitted from the plurality of communication devices, respectively, and directly reaching the detection device, and the transmitted signals reflected from one of the communication devices disposed near a terminal end of the communication line overlap each other;
 a measurement unit configured to measure each of a plurality of pulse widths of the overlap signals received by the reception unit; and
 a detection unit configured to detect one of the communication devices disposed near the terminal end of the communication line as a terminal-end communication device on the basis of the plurality of the pulse widths of the overlap signals measured by the measurement unit.

2. The detection device according to claim 1, wherein the detection unit is configured to detect the terminal-end communication device by identifying the one of the communication devices that has transmitted the overlap signal with the narrowest pulse width of the overlap signals received by the reception unit.

3. The detection device according to claim 1, further comprising a command unit configured to output a first command indicating a command for setting a terminating resistor to the terminal-end communication device when the terminal-end communication device is detected by the detection unit.

4. The detection device according to claim 3, further comprising a communication speed switching unit configured to switch communication setting to increase a communication speed in communication with the communication devices to be higher when the first command is output from the command unit.

5. The detection device according to claim 4, wherein the communication speed switching unit is configured to switch communication setting to decrease the communication speed in communication with the communication devices connected by the communication line to be lower when at least one of the communication devices is added or removed.

6. The detection device according to claim 3, wherein the command unit is configured to output a second command indicating a command for switching communication setting to increase a communication speed to be higher to at least one of the communication devices when the first command is output.

7. The detection device according to claim 3, wherein the command unit is configured to output a third command indicating a command for transmitting the transmitted signal of the prescribed pulse width to the plurality of communication devices.

8. The detection device according to claim 3, wherein the command unit is configured to output a fourth command indicating a command for releasing setting of a terminating resistor to the terminal-end communication device when at least one communication device is added or removed.

9. The detection device according to claim 3, wherein the command unit is configured to output a fifth command indicating a command for switching communication setting to decrease a communication speed in communication with the communication device connected by the communication line to be lower to the communication devices when at least one communication device is added or removed.

10. The detection device according to claim 1, further comprising an estimation unit configured to estimate a length of the communication line on the basis of the plurality of pulse widths measured by the measurement unit.

11. The detection device according to claim 1, wherein the communication device is a communication device provided in an indoor unit of an air-conditioner, and the detection device is provided in a management device configured to manage an outdoor unit or a plurality of indoor units of the air-conditioner.

\* \* \* \* \*